United States Patent
Nambiar

(10) Patent No.: US 11,567,957 B2
(45) Date of Patent: Jan. 31, 2023

(54) INCREMENTAL ADDITION OF DATA TO PARTITIONS IN DATABASE TABLES

(71) Applicant: salesforce.com, inc., San Francisco, CA (US)

(72) Inventor: Gopi Krishnan Nambiar, San Francisco, CA (US)

(73) Assignee: salesforce.com, inc.

(*) Notice: Subject to any disclaimer, the term of this patent is extended or adjusted under 35 U.S.C. 154(b) by 36 days.

(21) Appl. No.: 16/582,759

(22) Filed: Sep. 25, 2019

(65) Prior Publication Data

US 2021/0089527 A1     Mar. 25, 2021

(51) Int. Cl.
| | | |
|---|---|---|
| *G06F 7/00* | (2006.01) | |
| *G06F 16/2458* | (2019.01) | |
| *G06F 16/242* | (2019.01) | |
| *G06F 16/22* | (2019.01) | |
| *G06F 16/27* | (2019.01) | |
| *G06F 16/17* | (2019.01) | |

(52) U.S. Cl.
CPC ...... *G06F 16/2477* (2019.01); *G06F 16/1734* (2019.01); *G06F 16/221* (2019.01); *G06F 16/2291* (2019.01); *G06F 16/2425* (2019.01); *G06F 16/278* (2019.01)

(58) Field of Classification Search
CPC ........... G06F 16/2358; G06F 16/24554; G06F 16/2282; G06F 16/2477; G06F 16/221; G06F 16/2291; G06F 16/2425; G06F 16/278; G06F 16/1734

USPC .................. 707/615, 646, 649, 769
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

*Primary Examiner* — Md I Uddin
(74) *Attorney, Agent, or Firm* — LKGlobal | Lorenz & Kopf, LLP

(57) ABSTRACT

A method and system for accessing updated data from a database in response to a user query has been developed. First, multiple transaction logs are generated for a database. Each transaction log contains a record of actions executed by a database management system and referenced according to the specified date of the actions. Data updates are received and stored with the database. An incremental database partition is created for each data update. Each incremental database partition is stored with reference to a corresponding transaction log for the date of the data update. The updated data is accessed through the incremental database partition in response to an outdated user query. The outdated user query contains a data access request for a date earlier than the receipt of data updates.

15 Claims, 3 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0156794 A1* | 7/2007 | Kisley ............... G06F 16/00 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0195558 A1* | 7/2014 | Murthy ............ G06F 16/2358 707/770 |
| 2015/0220553 A1* | 8/2015 | Poon ................ G06F 16/2452 707/722 |
| 2016/0092543 A1* | 3/2016 | Shivarudraiah ... G06F 16/24554 707/600 |
| 2020/0034365 A1* | 1/2020 | Martin ............ G06F 16/2358 |
| 2020/0327130 A1* | 10/2020 | Ghazaleh .......... G06F 16/24532 |

* cited by examiner

INCREMENTAL ADDITION OF DATA TO PARTITIONS IN DATABASE TABLES

TECHNICAL FIELD

Embodiments of the subject matter described herein relate generally to database operations. More particularly, embodiments of the subject matter relate to incremental addition of data to partitions in database tables.

BACKGROUND

In operations of a database, data is continually updated but these updates may be delayed being entered into the database for various reasons. When a user queries a request to access data, often the latest data updates have not been entered. It would be advantageous to allow a user to run an original query and get new data which arrived later without changing the content of the query. Accordingly, it is desirable to provide a method of incremental addition of data to partitions in database tables. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
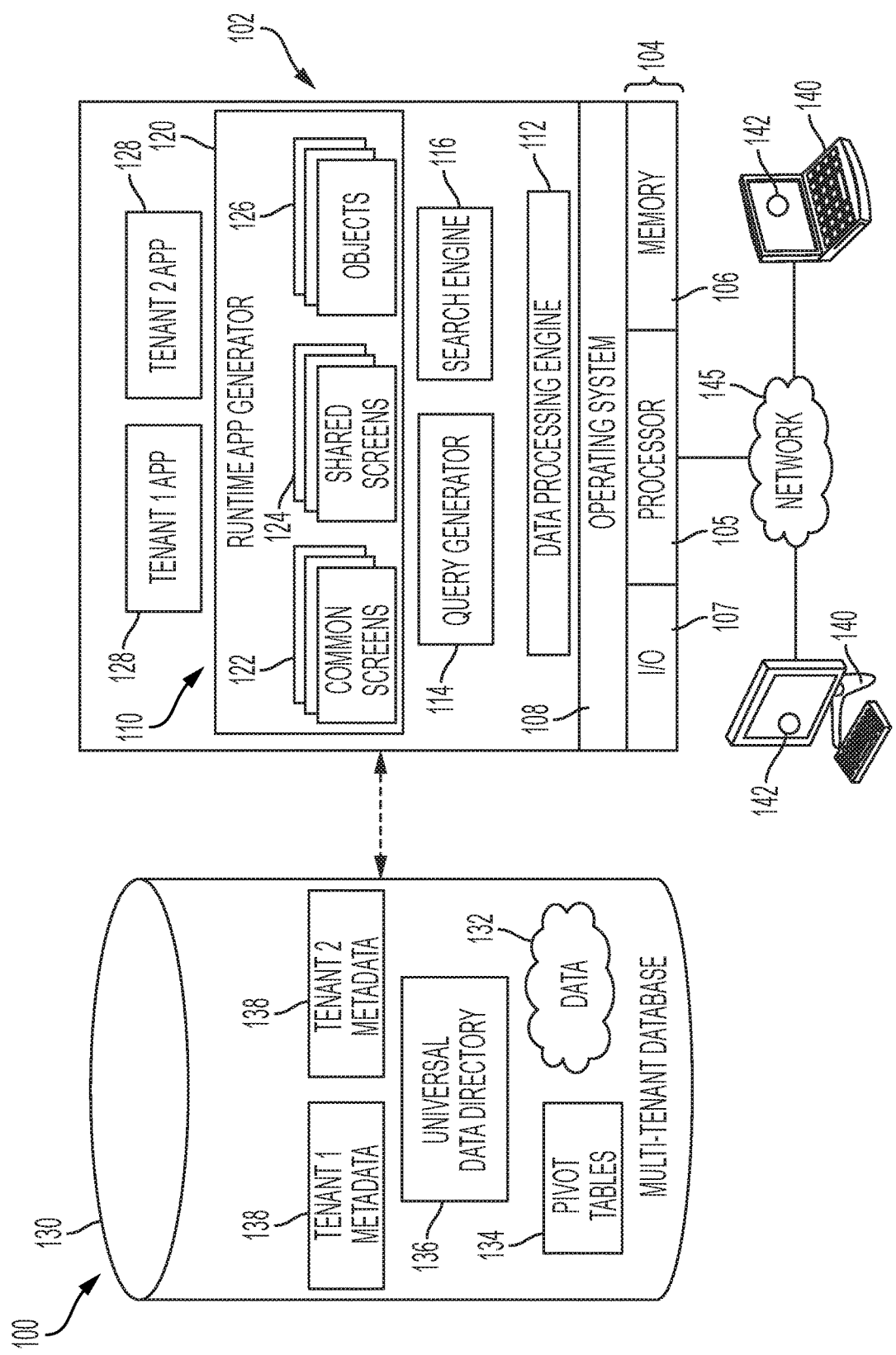
FIG. 1 is a diagram of an exemplary multi-tenant system that includes a server that dynamically creates and supports virtual applications based upon data from a database that may be shared between multiple tenants.

A method and system for accessing updated data from a database in response to a user query has been developed. First, multiple transaction logs are generated for a database. Each transaction log contains a record of actions executed by a database management system and referenced according to the specified date of the actions. Data updates are received and stored with the database. An incremental database partition is created for each data update. Each incremental database partition is stored with reference to a corresponding transaction log for the date of the data update. The updated data is accessed through the incremental database partition in response to an outdated user query. The outdated user query contains a data access request for a date earlier than the receipt of data updates.

In typical database operations transaction logs are generated by application servers on a daily basis. The transaction "logs" record anything in code that is activated by the database. In present embodiments, a separate partition is created for each time data is generated or updated. A "partition" is a field in the database which contains a mapping table. In addition to the partition, the date of the logs is already stored in the database. Upon receipt of a user query that is "outdated" (it contains a data access request earlier than the receipt of the most current data updates), the query accesses the database partition which then retrieves the most up-to-date data from the database.

This allows the user to get access to the latest data with no down time. This means that older data is not deleted to re-create the updated data stream. This also allows the user to access the most up-to-date data without changing their original query which is now outdated. Also, no duplication or copies of the data is present at any time in order to stay storage space. Instead the incremental database partitions reference the updated data according to their dates of generation.

Present embodiments may be executed in a Hive database. "Hive" is a data warehouse software project built on top of Apache Hadoop for providing data query and analysis. Apache Hadoop is a collection of open-source software utilities that facilitate using a network of many computers to solve problems involving massive amounts of data and computation.

A Hive database gives a SQL (structured query language)-like interface to query data stored in various databases and file systems that integrate with Hadoop. Hive provides the necessary SQL abstraction to integrate SQL-like queries (using a SQL-like query language called "HiveQL") into the underlying JAVA without the need to implement queries in a low-level JAVA API (application program interface). Since most data warehousing applications work with SQL-based querying languages, Hive aids portability of SQL-based applications to Hadoop.

Hive supports analysis of large datasets stored in Hadoop's HDFS ("Hadoop Distributed File System") and compatible file systems. It provides a HiveQL with schema on read and transparently converts queries to executable jobs. The execution engines can run in Hadoop's resource negotiator, YARN ("Yet Another Resource Negotiator"). To accelerate queries, YARN provides indexes, including bitmap indexes. Other features of Hive include:

Indexing to provide acceleration, index type including compaction and bitmap index;
Different storage types such as plain text, RCFile, HBase, ORC, and others;
Metadata storage in a relational database management system, significantly reducing the time to perform semantic checks during query execution;
Operating on compressed data stored into the Hadoop ecosystem using algorithms including DEFLATE, BWT, snappy, etc.;
Built-in UDFs (user-defined functions) to manipulate dates, strings, and other data-mining tools (Hive supports extending the UDF set to handle use-cases not supported by built-in functions); and
SQL-like queries (HiveQL), which are implicitly converted into MapReduce or Tez, or Spark jobs.

By default, Hive stores metadata in an embedded database and other client/server databases can optionally be used. The file formats supported in Hive are plain text, sequence file, ORC ("optimized row columnar") format and RCFile. Additional Hive plugins support querying of the Bitcoin Blockchain.

Major components of Hive architecture include:
Metastore: Stores metadata for each of the tables such as their schema and location. It also includes the partition metadata which helps the driver to track the progress of various data sets distributed over the cluster. The data is stored in a traditional RDBMS format. The metadata helps the driver to keep track of the data and it is crucial. Hence, a backup server regularly replicates the data which can be retrieved in case of data loss.

Driver: Acts like a controller which receives the HiveQL statements. It starts the execution of the statement by creating a session and monitors the life cycle and progress of the execution. It stores the necessary metadata generated during the execution of a HiveQL statement. The driver also acts as a collection point of data or query results obtained after the reduce operation.

Compiler: Performs compilation of the HiveQL query, which converts the query to an execution plan. This plan contains the tasks and steps needed to be performed to get the output as translated by the query. The compiler converts the query to an AST (abstract syntax tree). After checking for compatibility and compile time errors, it converts the AST to a DAG (directed acyclic graph). The DAG divides operators to stages and tasks based on the input query and data.

Optimizer: Performs various transformations on the execution plan to get an optimized DAG. Transformations can be aggregated together, such as converting a pipeline of joins to a single join, for better performance. It can also split the tasks, such as applying a transformation on data before a reduce operation, to provide better performance and scalability. However, the logic of transformation used for optimization used can be modified or pipelined using another optimizer.

Executor: After compilation and optimization, the executor executes the tasks. It interacts with a job tracker to schedule tasks to be run. It takes care of pipelining the tasks by making sure that a task with dependency gets executed only if all other prerequisites are run.

CLI, UI, and Thrift Server: A CLI (command-line interface) provides a UI (user interface) for an external user to interact with Hive by submitting queries, instructions and monitoring the process status. Thrift server allows external clients to interact with Hive over a network, similar to the JDBC or ODBC protocols.

While based on SQL, HiveQL does not strictly follow the full SQL-92 standard. HiveQL offers additional extensions, including "multi-table inserts" and "create table as select", but only offers basic support for indexes. HiveQL also provides support for insert, update, and delete with full ACID (atomicity, consistency, isolation, and durability) functionality. The storage and querying operations of Hive closely resemble those of traditional databases. While Hive is a SQL dialect, there are a lot of differences in structure and working of Hive in comparison to relational databases. The differences are mainly because Hive is built on top of the Hadoop ecosystem, and has to comply with the restrictions of Hadoop.

A schema is applied to a table in traditional databases. In such traditional databases, the table typically enforces the schema when the data is loaded into the table. This enables the database to make sure that the data entered follows the representation of the table as specified by the table definition. This design is called "schema on write". In comparison, Hive does not verify the data against the table schema on write. Instead, it subsequently does run time checks when the data is read. This model is called "schema on read". The two approaches have their own advantages and drawbacks. Checking data against table schema during the load time adds extra overhead, which is why traditional databases take a longer time to load data.

Quality checks are performed against the data at the load time to ensure that the data is not corrupt. Early detection of corrupt data ensures early exception handling. Since the tables are forced to match the schema after/during the data load, it has better query time performance. Hive, on the other hand, can load data dynamically without any schema check, ensuring a fast initial load, but with comparatively slower performance at query time. Hive does have an advantage when the schema is not available at the load time but is instead generated later dynamically.

Transactions are key operations in traditional databases. As with any typical RDBMS, Hive supports all four properties of ACID transactions. Transactions in Hive provide different row level transactions such as INSERT, DELETE and UPDATE. Enabling INSERT, UPDATE, DELETE transactions require setting appropriate values for configuration properties.

Hive provides integration with Hadoop security using Kerberos authorization support. Kerberos allows for mutual authentication between client and server. In this system, the client's request for a ticket is passed along with the request. TaskTracker jobs are run by the user who launched it and the username can no longer be spoofed. Permissions for newly created files in Hive are dictated by the HDFS. The Hadoop distributed file system authorization model uses three entities: user, group and others with three permissions: read, write and execute. The default permissions for newly created files can be set by changing the unmask value.

It would be advantageous to analyze the images posted across a data group to identify points of interest and detect positive usage trends across groups. Embodiments of the subject matter described herein generally relate to techniques for processing and analysis of posted online images. More particularly, embodiments of the subject matter relate to identifying positive usage trends based on analysis of posted online images. The disclosed embodiments described below may be implemented in a wide variety of different computer-based systems, architectures and platforms which may include a multi-tenant system. Additionally, the disclosed embodiments may be implemented using mobile devices, smart wearable devices, virtual systems, etc.

Turning now to FIG. 1, an exemplary multi-tenant system 100 includes a server 102 that dynamically creates and supports virtual applications 128 based upon data 132 from a database 130 that may be shared between multiple tenants, referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100. In accordance with one non-limiting example, the multi-tenant system 100 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 130. In this regard, each tenant includes one or more users associated with, assigned to, or otherwise belonging to that respective tenant. Stated another way, each respective user within the multi-tenant system 100 is associated with, assigned to, or otherwise belongs to a particular one of the plurality of tenants supported by the multi-tenant system 100. Tenants may represent companies, corporate departments, business or legal organizations, and/or any other entities that maintain data for particular sets of users (such as their respective customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other tenants.

The multi-tenant database 130 may be a repository or other data storage system capable of storing and managing the data 132 associated with any number of tenants. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128, as described in greater detail below. The multi-tenant database 130 may alternatively be referred to herein as an on-demand database, in that the multi-tenant database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below. Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

Figure 2:
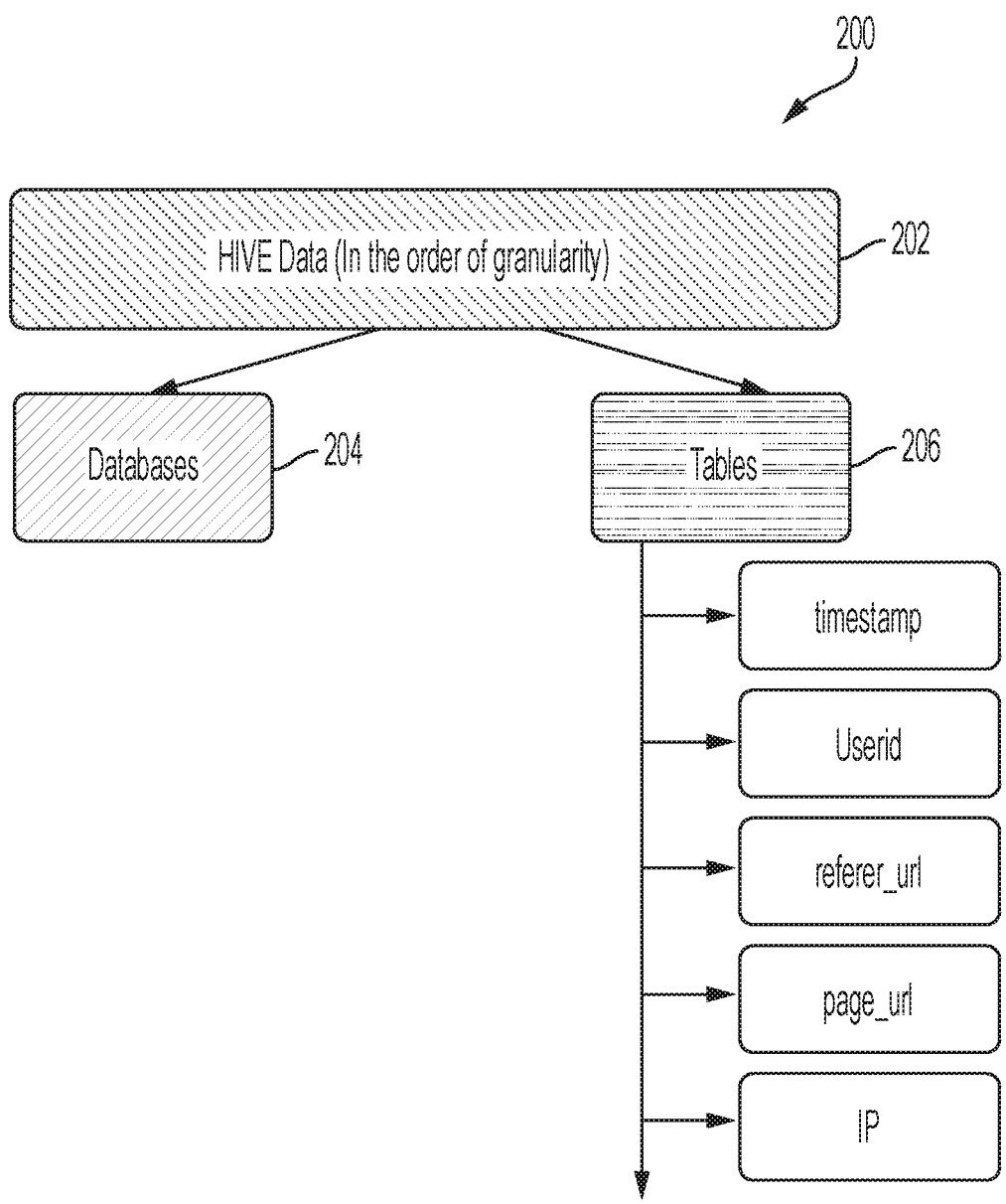
FIG. 2 is block diagram that depicts the relationship of hive data to databases and tables in accordance with one embodiment.

Turning now to FIG. 2, a block diagram 200 is shown that depicts the relationship of Hive data 202 to databases 204 and tables 206 in accordance with one embodiment. The Hive data 202 is stored in various databases 204 that have corresponding tables 206. The tables 206 are listed in FIG. 2 in order of granularity (i.e., descending order of complexity). These tables 206 include various tables for: timestamps; user IDs; reference URLs; page URLs; and internet protocols (IP).

Figure 3:
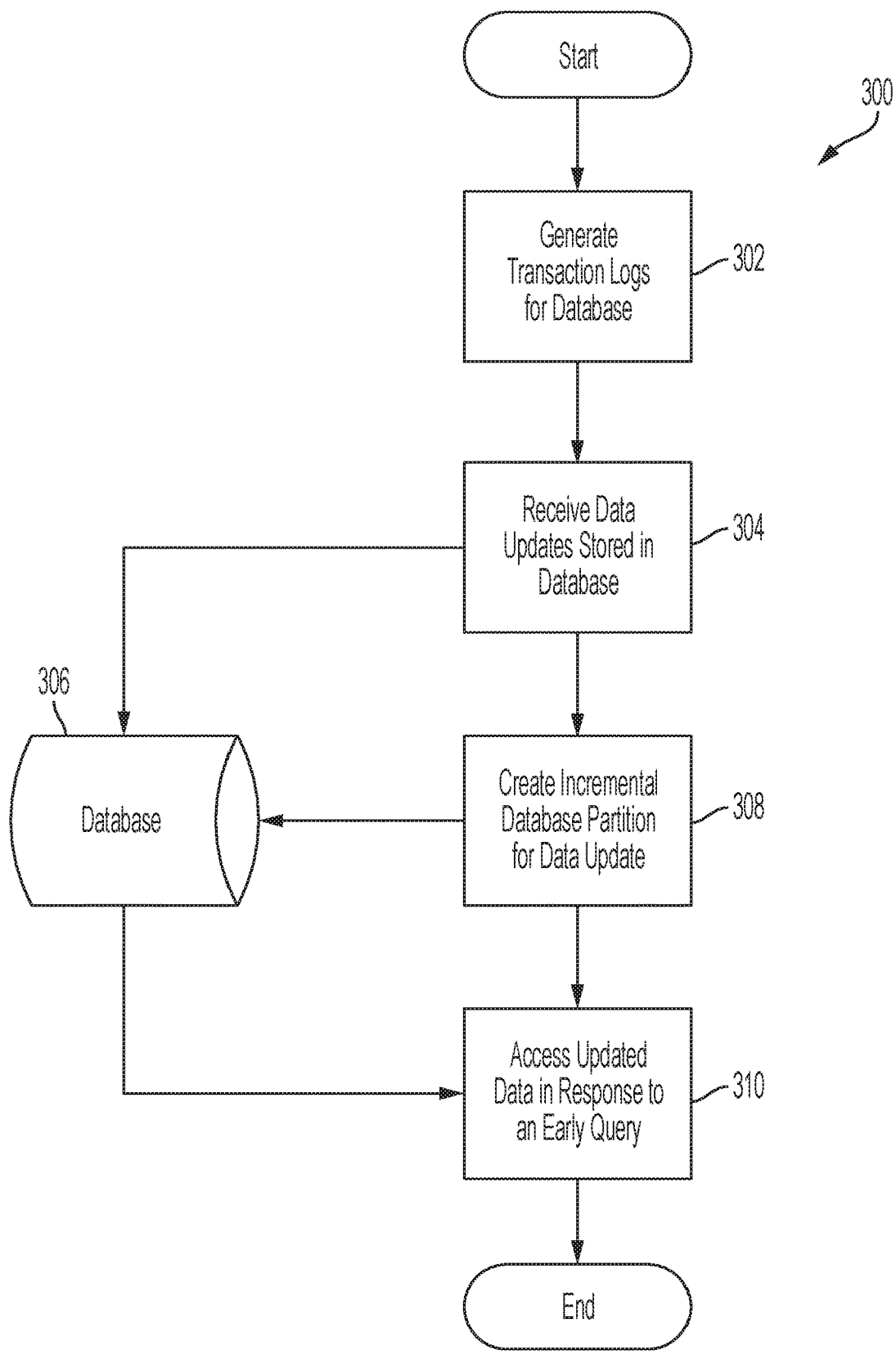
FIG. 3 is a flowchart of a method of incremental addition of data to partitions in database tables in accordance with one embodiment.

Turning now to FIG. 3, a flowchart 300 is shown of a method for accessing updated data from a database in response to user query. First, multiple transaction logs are generated 302 for the database 6. Each transaction log contains a record of actions that are executed by a database management system and referenced according to the specific date of the actions. Periodic data updates are received 304 that are then stored within the database 306. An incremental database partition is created for each data update 308. Each incremental database partition is stored according to the date of the data update and a corresponding transaction log that is then stored in the database 306. The updated data is then accessed in response to an outdated user query 310. An outdated user query is a query that contains a data access request from a date earlier than the receipt of the data updates.

The advantage of present embodiments is that they allow the end customer get access to the latest data that has been refreshed with the latest amount of data that has been updated through the system. The solution designed adds a separate partition in Hive for each time the data was generated in addition to the existing partition for the date of the logs already stored. For example, logs stored into Hive already exist for a specified date. As additional data is received for additional days, the new data is stored in another partition under a reference of the original specified date.

In this manner, we are able to store the new data is able to be stored without duplicating any of the previous data. Users may use the same query to get the latest data and the data gets updated as new partitions are created. In some embodiments, there is no downtime or phase where we delete the old data is deleted to recreate new data and regenerated filtered data sets with the new and incremental data that were updated into the system.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

"Node/Port"—As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node). As used herein, a "port" means a node that is externally accessible via, for example, a physical connector, an input or output pin, a test probe, a bonding pad, or the like.

"Connected/Coupled"—The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown depicts one exemplary arrangement of elements, additional intervening elements, devices, features, or components may be present in an embodiment of the depicted subject matter.

In addition, certain accessing uploaded data terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The various tasks performed in connection with process may be performed by software, hardware, firmware, or any combination thereof. For illustrative purposes, the following description of process may refer to elements mentioned above. In practice, portions of process may be performed by different elements of the described system, e.g., component A, component B, or component C. It should be appreciated that process may include any number of additional or alternative tasks, the tasks shown need not be performed in the illustrated order, and process may be incorporated into a more comprehensive procedure or process having additional functionality not described in detail herein. Moreover, one or more of the tasks shown could be omitted from an embodiment of the process as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for accessing updated data from a database in response to a user query, comprising:
   generating multiple transaction logs for the database, where each transaction log contains a record of actions executed by a database management system and referenced according to the specified date of the actions, where the database is a Hive database;
   receiving data updates that are stored with the database;
   creating an incremental database partition for each data update, where a most recent incremental database partition is stored in addition to all previous incremental database partitions and stored with reference to a corresponding transaction log with a generation date of the data update so that no duplicate copies of the data update with an earlier generation date are stored in the database;

receiving a user query for accessing data in the database, where the user query is an outdated user query; and accessing updated data with no downtime through the incremental database partition in response to the outdated user query without changing the content of the outdated user query, where the outdated user query contains a data access request for a date earlier than the receipt of data updates.

2. The method of claim 1, where the user query uses HiveQL query language.

3. The method of claim 2, where HiveQL supports ACID (atomicity, consistency, isolation and durability) properties of operations of the database.

4. The method of claim 1, where the database management system is HDFS (Hadoop Distributed File System).

5. The method of claim 1, where the database utilizes a YARN (Yet Another Resource Negotiator) execution engine.

6. A system for accessing updated data from a database in response to
a user query, comprising:
a microprocessor; and
a memory coupled to the processor, wherein the memory includes computer program instructions capable of,
generating multiple transaction logs for the database, where each transaction log contains a record of actions executed by a database management system and referenced according to the specified date of the actions, where the database is a Hive database,
receiving data updates that are stored with the database,
creating an incremental database partition for each data update, where a most recent incremental database partition is stored in addition to all previous incremental database partitions and stored with reference to a corresponding transaction log with a generation date of the data update so that no duplicate copies of the data update with an earlier generation date are stored in the database,
receiving a user query for accessing data in the database, where the user query is an outdated user query, and
accessing updated data with no downtime through the incremental database partition in response to the outdated user query without changing the content of the outdated user query, where the outdated user query contains a data access request for a date earlier than the receipt of data updates.

7. The system of claim 6, where the user query uses HiveQL query language.

8. The system of claim 7, where HiveQL supports ACID (atomicity, consistency, isolation and durability) properties of operations of the database.

9. The system of claim 6, where the database management system is HDFS (Hadoop Distributed File System).

10. The system of claim 6, where the database utilizes a YARN (Yet Another Resource Negotiator) execution engine.

11. A non-transitory computer readable storage media comprising:
computer instructions to implement,
generating multiple transaction logs for the database, where each transaction log contains a record of actions executed by a database management system and referenced according to the specified date of the actions, where the database is a Hive database,
receiving data updates that are stored with the database,
creating an incremental database partition for each data update, where a most recent incremental database partition is stored in addition to all previous incremental database partitions and stored with reference to a corresponding transaction log with a generation date of the data update so that no duplicate copies of the data update with an earlier generation date are stored in the database,
receiving a user query for accessing data in the database, where the user query is an outdated user query, and
accessing updated data with no downtime through the incremental database partition in response to the outdated user query without changing the content of the outdated user query, where the outdated user query contains a data access request for a date earlier than the receipt of data updates.

12. The storage media of claim 11, where the user query uses HiveQL query language.

13. The storage media of claim 12, where HiveQL supports ACID (atomicity, consistency, isolation and durability) properties of operations of the database.

14. The storage media of claim 11, where the database management system is HDFS (Hadoop Distributed File System).

15. The storage media of claim 11, where the database utilizes a YARN (Yet Another Resource Negotiator) execution engine.

* * * * *